United States Patent [19]

Berresheim

[11] Patent Number: 5,074,660

[45] Date of Patent: Dec. 24, 1991

[54] METHOD AND APPARATUS FOR MEASURING ROTATING MOVEMENTS

[75] Inventor: Alexander Berresheim, Brunnthal, Fed. Rep. of Germany

[73] Assignee: Messerschmitt-Bolkow-Blohm GmbH, Fed. Rep. of Germany

[21] Appl. No.: 561,599

[22] Filed: Aug. 2, 1990

[30] Foreign Application Priority Data

Aug. 12, 1989 [DE] Fed. Rep. of Germany ....... 3926763

[51] Int. Cl.⁵ .................... G01B 11/26; G01B 11/14; G01D 5/34; G01P 3/36
[52] U.S. Cl. .................. 356/152; 250/231.13; 250/231.16; 324/175; 356/375
[58] Field of Search .............. 250/231.13, 231.16; 324/175; 356/152, 375

[56] References Cited

U.S. PATENT DOCUMENTS 3,654,480  4/1972  Stephenson .................. 324/175

FOREIGN PATENT DOCUMENTS 2907703  9/1980  Fed. Rep. of Germany .
2626972  8/1989  France ................... 250/231.13
1093972  5/1984  U.S.S.R. ................. 324/175

Primary Examiner—Stephen C. Buczinski
Attorney, Agent, or Firm—Evenson, Wands, Edwards, Lenahan & McKeown

[57] ABSTRACT

The invention relates to a method and apparatus for the digital measurement of rotational movements betewen two members which rotate with respect to one another, using two light beams which circulate synchronously in opposite directions in fixed spatial relationship relative to one such member, and two sensors mounted in fixed spatial relationship to the other such member. Angular rotation of said members is determined by analysis of the frequency and phase of the output from the sensors.

25 Claims, 7 Drawing Sheets

METHOD AND APPARATUS FOR MEASURING ROTATING MOVEMENTS

BACKGROUND AND SUMMARY OF THE INVENTION

The present invention relates to a method and apparatus for digitally measuring rotational movements of two reference systems relative to each other through the use of two light beams circulating in opposite directions and the detection of phase and frequency differences in the output of light sensors mounted on one of such reference systems.

Methods and apparatus of this general type are known in various embodiments, including those previously disclosed by the applicant. They are based on the principle of measuring transit time differences in two reference systems which rotate with respect to one another, one forming the measuring system and the other forming the system to be measured. Numerous types of laser gyros and gravitational wave detectors and similar devices are based on this idea. In all these devices it is found, however, that the measurement of low rotational speeds with high a precision and resolution not only requires high expenditures with respect to equipment, but also is characterized by difficulties with respect to manufacturing techniques. Thus, for example, direct-current tacho generators furnish very low voltages at low speeds and, in addition, the ripple of the signal, as a result of the commutation and the transition from one commutator bar to the adjacent one, has a distorting effect. Similarly, devices for measuring rotational speed by means of digital angle generators require a very high resolution for the detection of low speeds, which results in increased expenditures with respect to the weight and the overall size.

It is an object of the present invention to provide a method and apparatus for the measurement of angular movement which minimizes the overall size and weight of the measuring device.

Another object of the invention is to provide a device for measuring angular movement which is simplified without any impairment of the reliability and the precision of the measuring system, especially in the case of low rotational speeds.

These and other objects of the invention are achieved by providing a source of two light spots which rotate in opposite directions in concentric orbits in a measuring plane. Sensors are mounted on a member which is rotatable about the axis of rotation of the light spots, one such sensor being disposed adjacent the orbit of each of said light spots. The angle and speed of rotation of such member are then determined by measuring the phase or frequency of the output signals from the sensors.

Other objects, advantages and novel features of the present invention will become apparent from the following detailed description of the invention when considered in conjunction with the accompanying drawings.

DETAILED DESCRIPTION OF THE DRAWING

The circulating reference system of the present invention, two light beams which circulate in opposite directions, can be generated in various ways with different expenditures. In view of the demand for a high reliability and simplicity, a system is suggested in which a light beam $\Phi$ originating from a stationary light source 13 is deflected by pivotable mirrors 10, 11. In this case, it is of subordinate significance whether a miniature laser system or an IR-LED with a corresponding focussing is used as the light source 13 (FIG. 1).

Figure 1:
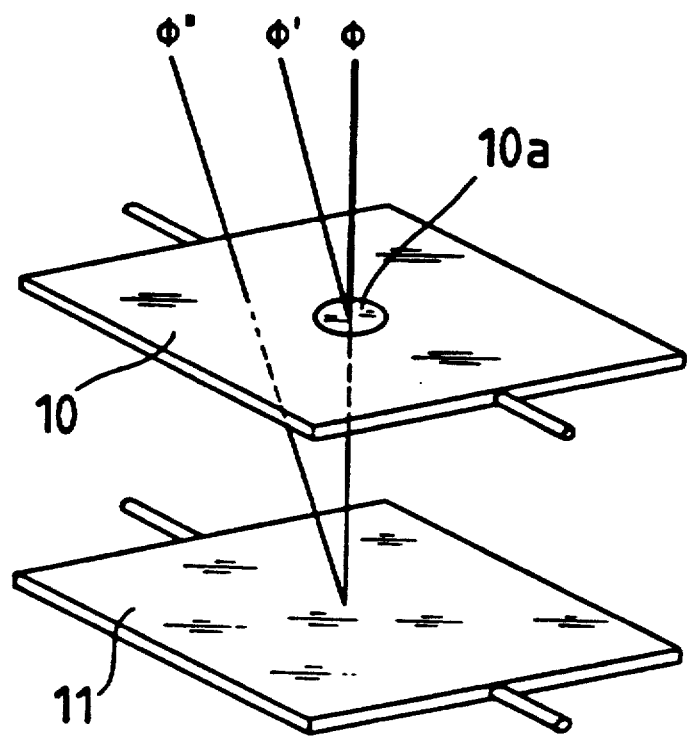
FIG. 1 is a simplified perspective representation of the generation of sensing beams.
Figure 2:
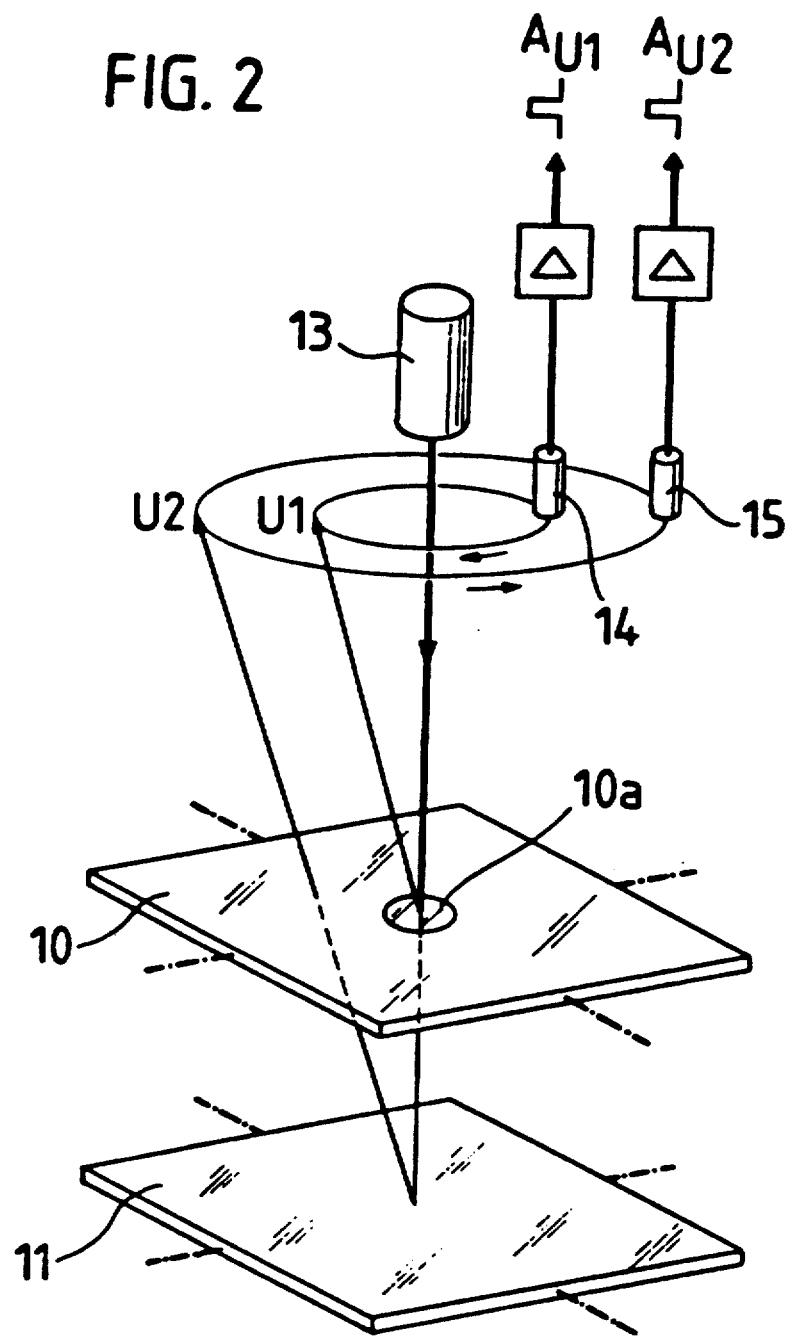
FIG. 2 is a simplified perspective representation of the mirror deflection.
Figure 5:
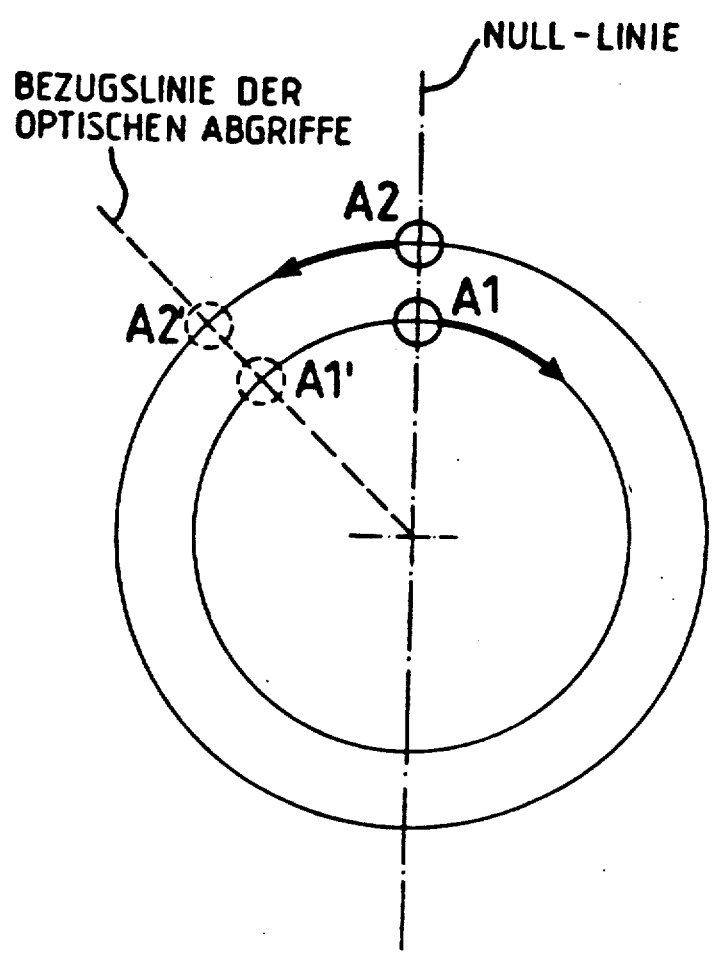
FIG. 5 is a simplified schematic representation defining the reference system.

In the measuring method suggested here, two light spots A1, A2 are required which circulate in a measuring plane in concentric orbits with different diameters (see FIGS. 1, 2 and 5 in this regard). The inner circulating orbit U1 is generated by deflecting a light beam $\Phi$ by means of a mirror 10 which can be pivoted in two axes and, as a result, obtains the reflected beam $\Phi'$.

As shown in FIG. 1, the upper mirror 10—which is constructed as a swivel plate—comprises a relatively small partially transparent mirror 10a for generating the beam $\Phi'$. The remaining surface of the swivel plate consists of an optically perfect clear glass.

The residual beam which now passes through the first mirror 10 or 10a impinges on the second pivotal mirror situated below it. The second mirror is totally reflecting and generates the second beam $\Phi''$ which can now pass through the clear glass in an unimpaired manner. If the degree of transparency of the upper mirror 10 is assumed to be approximately 0.52 to 0.55, two light beams of approximately the same intensity are obtained taking into account the absorption of the glass and the degree of reflection of the lower mirror 11.

Figure 4:
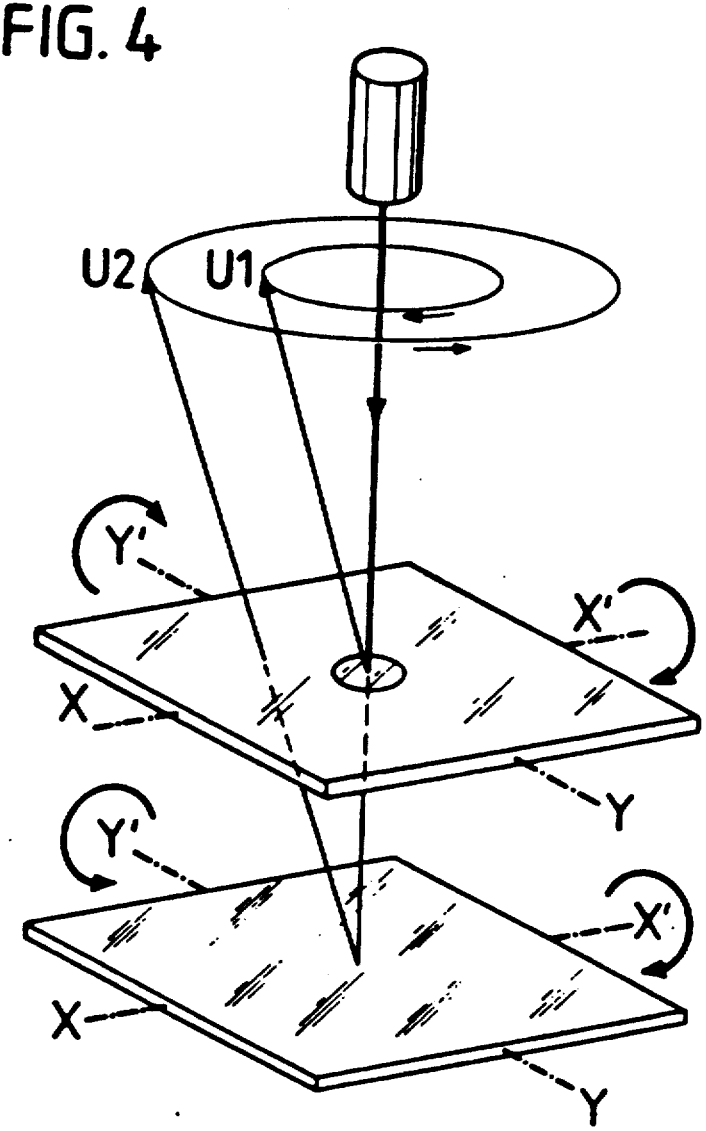
FIG. 4 is a simplified perspective outline of the mirror deflection.

In order to obtain the mentioned light circulating orbits U1 and U2 which move in opposite directions, the two mirrors 10, 11 must be moved around the X—X' axes in an equiphase and sinusoidal manner, whereas the movement around the Y—Y' axes takes place in a opposite-phase cosinusoidal manner. These relationships of movement are shown in FIG. 4. In order to obtain the orbits U1 and U2, the amplitudes of the mirror movements are identical for the X-axes and Y-axes but may, depending on the geometry, have different values for the upper mirror 10 than for the lower mirror 11.

Figure 3:
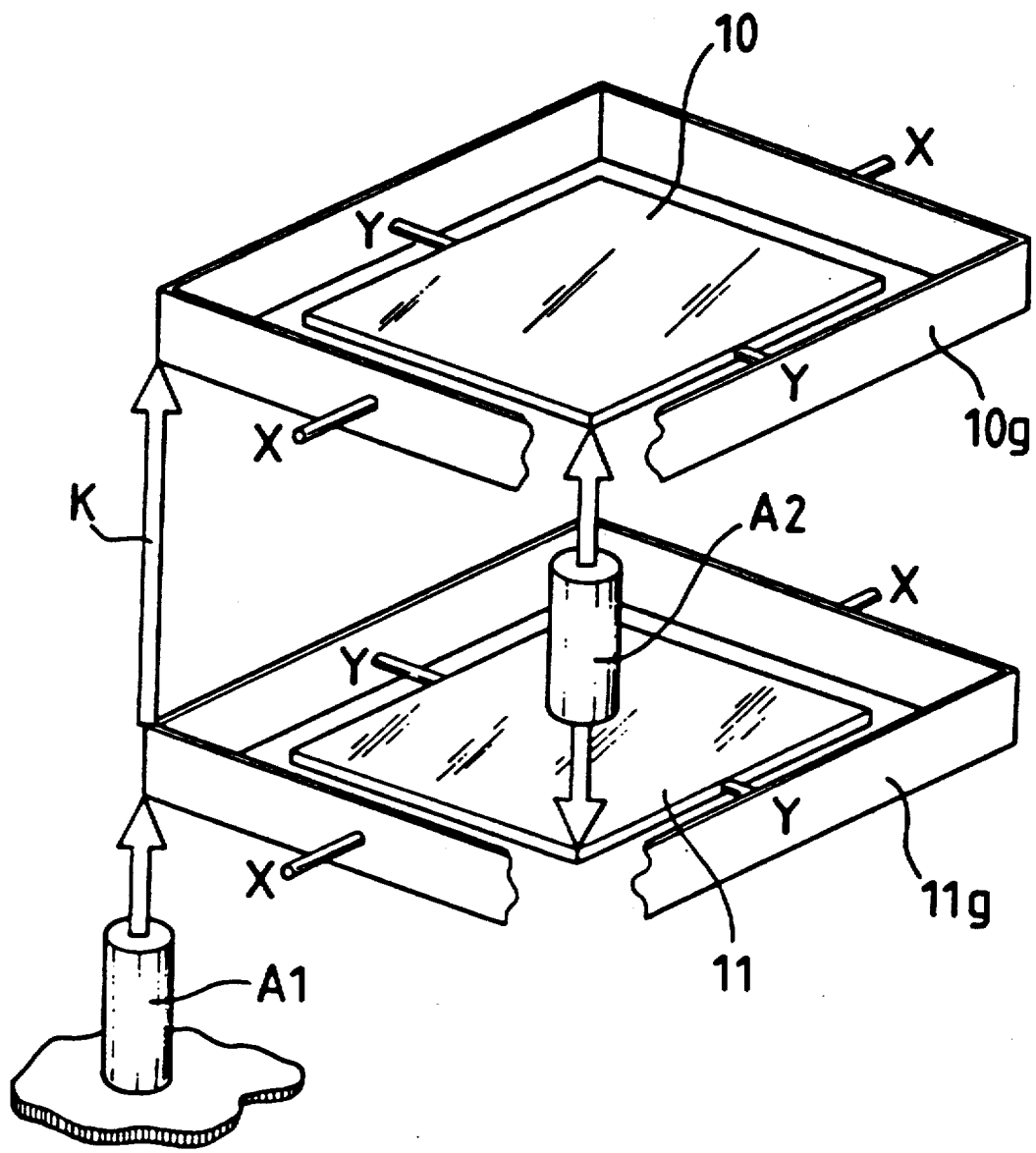
FIG. 3 is a simplified perspective representation of the driving principle for the mirror movements.

By means of a suitable selection of the drives A for the mirrors 10, 11, absolute synchronism of the circulating light spots A1, A2 is ensured. Since the mirrors 10, 11 must be moved in two axes, a cardanic suspension is provided in a known manner, as depicted in FIG. 3. In order to avoid disturbing translational movements at the mirrors 10, 11, which occur during the pivoting around a common axis, the respective X-axes of the two swivel systems are separated. For the same reason, the axes of the suspension must be disposed asymmetrically with respect to the mirror body precisely in the reflecting plane. The mounting of the inner drive A2 between the two mirrors 10, 11 causes the opposite-phase deflection around the Y-axes.

The outer drive A1 which is coupled to the housing or the mirror frame 11g and, by way of an articulated but rigid coupling K, to the upper mirror frame 10g, moves the two mirrors 10, 11 in a synchronous and equiphase manner around the X-axes.

This new arrangement allows a minimizing of the previous manufacturing dimensions. Thus, for example, the surfaces carrying the mirrors may have an edge length of maximally only 10 mm. The distance of the two mirrors 10, 11 may be in the same order of magnitude so that the whole construction of the swivel system, including the frames 10g, 11g, respectively, the housing G1 in which the second housing G2 is rotatably disposed, and the drives A1, A2 have sufficient space in a cube of an edge length of approximately from 20 to 25 mm or a correspondingly large cylinder housing.

In one embodiment of the invention, cross-spring elements or strap elements are preferably suggested as the bearing for the mirrors 10, 11 and the frames 10g, 11g. Such a bearing has the advantage that there is no friction and, in addition, a mechanical elastic suspension is made possible around the respective axes. This, in turn, facilitates the design of the drives A1, A2, for example, as so called plunger coils. If the inner drive A2 is conceived as a plunger coil, one mirror surface can carry the coil and the other mirror surface can carry the magnetic core. A similar approach may be used for the design of the outer drive, in which case, the coil must then be mounted at the housing in a fixed manner (FIG. 3).

In another embodiment, parts of surfaces or frames are constructed as conductors through which a current passes and are mounted in a magnetic field fixed at the housing. It is also possible to carry out the suspension of the mirrors on two tension wires through which current flows, as in the case of Duddel oscillographs, in which case this suspension would then include a strap bearing.

The measuring principle is outlined in FIG. 2. Two optoelectrical taps 14, 15 are assigned to the light source 13 for analyzing the reflected beams $\Phi'$ and $\Phi''$ or their light spots A1 and A2 on the orbits U1 and U2. These taps 14, 15 are arranged rigidly with respect to one another in such a manner that the light spots A1, A2 which circulate in opposite directions sweep over them separately. FIG. 5 illustrates the orientation of the rotating systems. The light spots A1, A2, which orbit synchronously with respect to one another, form the reference system. That diameter of the orbits U1, U2 on which the light spots A1, A2 meet one another is defined as the zero line or null line.

The optical electrical taps 14, 15 can be rotated freely around the same center as the reference system. In this case, the zero reference is that position in which, in the case of the taps 14, 15, simultaneously rising flanks are generated by the light spots A1, A2 sweeping over them. This no longer requires an adjustment of the taps in the tangential direction resulting in a further simplification of the implementation.

If the taps 14, 15 are now rotated from their zero position (see FIG. 5) around the angle $\Phi$ into a new position, two effects will occur:

a) the rising flanks of the scanning signals now have a defined time interval and a changed phase relation with respect to the control signal which correspond the angle that was covered, and b) during the rotating operation, the scanning frequencies have changed, specifically by amounts which correspond to the rotating speed.

The phase relation of the scanning signal flanks reflects the angular rotation of the reference systems.

The new scanning frequencies—or the time period between two rising flanks of one and the same tap 14 or 15—correspond to the sum or the difference of the rotating speed and the angular velocity of the light spots which orbit in opposite directions.

Figure 6:
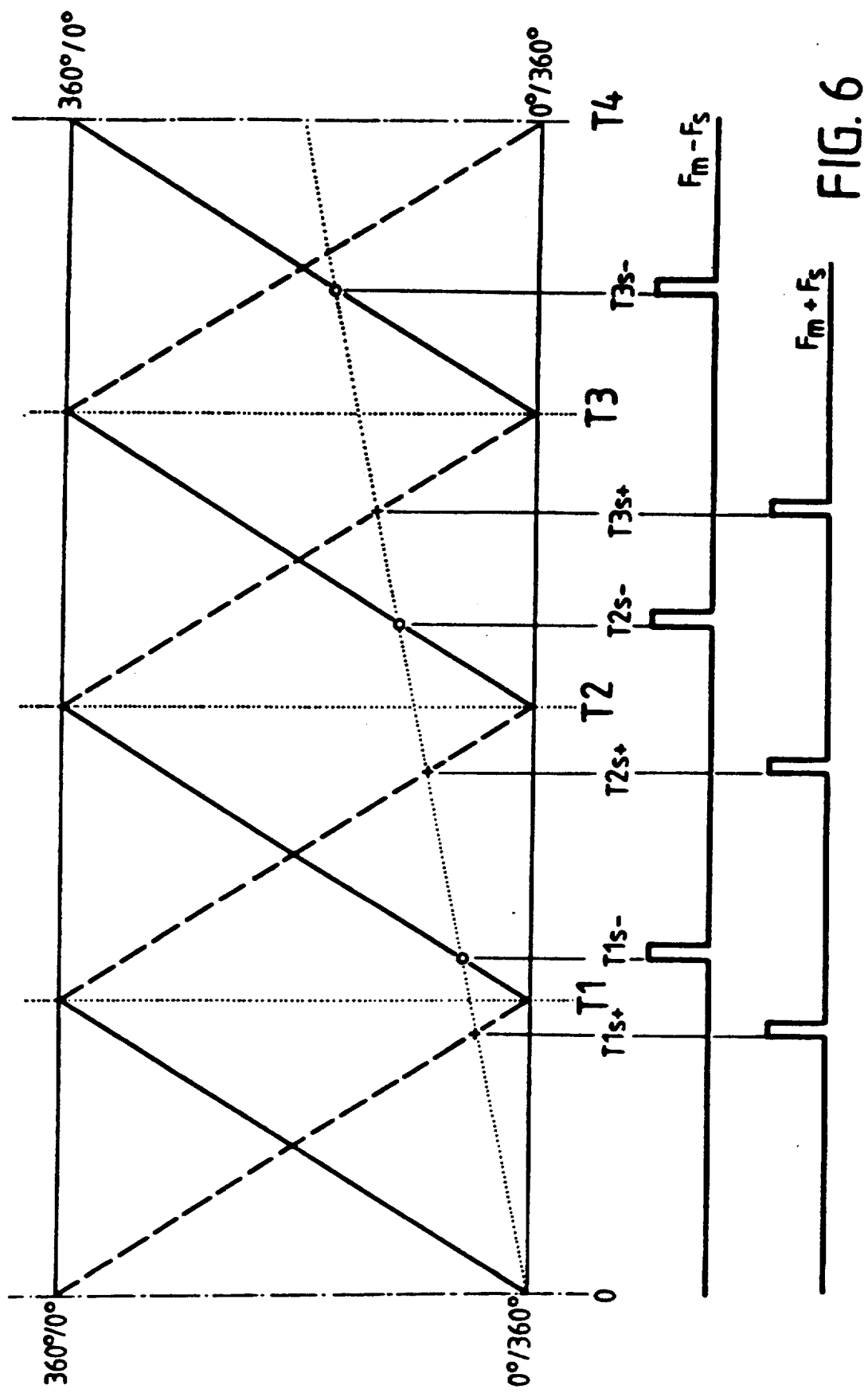
FIG. 6 is a diagram representing the frequency modulation principle.

This is illustrated in FIG. 6 of the drawing. In this case, the solid and interrupted saw tooth curves represent the movement of the respective light spots in their respective orbits. The jumps in the diagram can clearly be recognized after one orbit at T1, T2, etc., respectively. The dotted, flatly rising line corresponds to the movement of the taps 14, 15 during the rotation.

Points where the light spots sweep over the taps and generate the pulses (T1s+, T1s−, etc.) are marked by symbols + and o. The diagram shows that the pulse trains occur at different frequencies. These differences are used to determine the rotational speed, by measuring the phase relationship of the pulses or by measuring the difference.

When the relationship is measured, the pulse sequence frequencies of the taps 14 (F+) and 15 (F−) are as follows:

$$F+ = Fm + Fs \ (rad/s) \quad (1)$$

$$F- = Fm - Fs \ (rad/s) \quad (2)$$

wherein Fm is the measuring frequency; i.e., the control frequency of the orbiting light spots A1, A2, and FS is the interfering frequency; i.e., the speed of rotation of the taps 14, 15. The ratio F+/F− forms a measurement of the rotating speed.

When measuring the difference, each pulse train controls the gate of a counter which is acted upon by a measuring frequency. The counter contents represent the period duration of the pulse trains, and the counter difference is a measurement of the occurred rotating speed.

Figure 7:
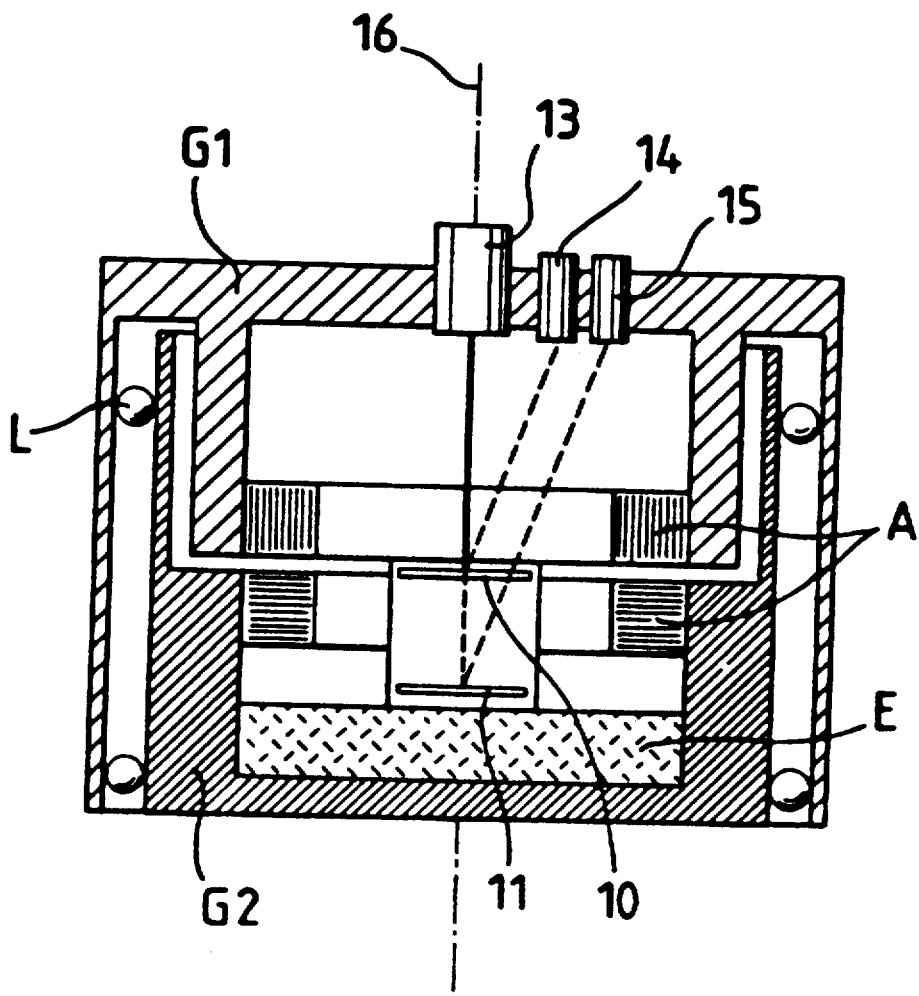
FIG. 7 is a schematic representation of a cross-sectional view of an embodiment of a measuring apparatus.

An embodiment of a device for the digital measuring or rotational movements is outlined in FIG. 7 of the drawing. Two housing parts G1 and G2, are rotatable with respect to one another on bearings L, and are adapted to be insertable inside one another. The outer housing part G1 fully accommodates the inner housing part G2. In addition, the outer housing part G1, in the central rotating shaft 16, accommodates a light source 13 and the scanning elements or taps 14, 15 for the light spots A1, A2 disposed adjacent to a measuring plane and orbiting on concentric orbits U1, U2 with different diameters. The inner housing part G2 encloses the swivel mirror system formed by mirrors 10, 11 and the electronic system for the mirror control E. A drive A is assigned to both housing parts G1, G2 and was described above in the embodiments. The energy transmission between the two housing parts which can be rotated with respect to one another, in the case of limited angles of rotation, may take place by means of a cable loop. For the free continuous rotating, an inductive energy transmission system is suggested which is outlined in FIG. 7 and which represents an additional advantage because the electronic control system arranged in the floor of the housing G2 requires only little energy. By the use of microtechnological methods, parts of the swivel mirror system including the electromechanical drives and the optical elements (mirror surfaces) may be constructed as integral components by etching. A similar situation applies to the electronic analyzing system.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method for measuring relative rotational movements between two members rotatable with respect to each other comprising the steps of: generating at least two reference signal beams that rotate synchronously in opposite directions in concentric orbits in a measuring plane, and having a fixed spatial relationship to a first of said members,
   detecting each of said signal beams by means of sensors mounted in fixed spatial relationship to a second of said members, and
   analyzing at least one of the relative phase and frequency of each of said signal beams detected by said sensors, as a measure of said relative rotational movement.

2. Method according to claim 1, wherein said reference signal beams are light beams.

3. The method according to claim 2, wherein said light beams are generated by means of two pivotable mirrors which are arranged in fixed spatial relationship relative to said first member, and which are oscillated about a first axis in an equiphase sinusoidal manner, and about a second axis in an opposite phase sinusoidal manner, said first and second axes being perpendicular to each other in the plane of said mirrors.

4. A method for the digital measurement of rotational movements between two reference systems which rotate with respect to one another comprising the steps of:
   a) generating two light spots, which rotate in opposite directions in concentric orbits in a measuring plane, by means of pivotable upper and lower mirrors which are arranged in fixed spatial relationship to one of said reference systems and which are moved around first axes in an equiphase sinusoidal manner and around second axes in an opposite-phase consinusoidal manner, the relative amplitudes of the mirror movement for the respective first and second axes having values corresponding to the selected geometry of the upper mirror,
   b) generating measuring pulses by means of two sensors which are arranged in fixed spatial relationship to the other of said reference systems and rigidly with respect to one another in such a manner that the light spots orbiting in opposite directions sweep over them separately,
   c) analyzing the measuring pulses in a computer to determine rotational speed, and
   d) analyzing the phase relation of the measuring pulses in a computer as a measure of said rotational movements.

5. The method according to claim 4, wherein said light spots form one of said reference systems, and said sensors form the other of said reference systems, the diameter of said orbits on which said light spots meet being considered as the reference line of the first system, and the position in which the light spots generate simultaneously rising measuring signal flanks when sweeping over said sensors being used as the zero position of the sensing system.

6. A method according to claim 4, wherein rotational movement is determined from a ratio of the frequencies of said measuring pulses generated by said sensors.

7. A method according to claim 4, wherein rotational movement is determined from the difference of the frequencies of said measuring pulses generated by said sensors.

8. A method according to claim 4, wherein an angle of rotation is determined from the phase relation of the measuring pulses generated by said sensors.

9. Apparatus for measuring relative rotational movements between first and second members that are rotatable relative to each other, comprising:
   light source for generating at least two light spots which rotate synchronously in opposite direction in concentric orbits in a measuring plane in fixed spatial relationship to said first member;
   sensor means associated with each of said concentric orbits for sensing the passage of said light spot which rotates in said orbit, and for generating pulses in response thereto, said sensor means being mounted in fixed spatial relationship to said second member and relative to each other; and
   means for analyzing at least one of the relative phase and frequency of the pulses generated by each of said sensor means as a measure of said relative rotational movements between said members.

10. Apparatus according to claim 9, wherein said light source means comprises at least two pivotable mirrors each which is adapted to be oscillated about first and second rectilinear axes thereof, means for oscillating said mirrors about their respective first axes in an equiphase sinusoidal manner, and means for oscillating said mirrors about their respective second axes in an opposite phase sinusoidal manner.

11. The apparatus according to claim 10, wherein said first and second members comprise first and second housings respectively, said first and second housings being rotatable relative to one another and insertable one inside the other, said second housing having a central rotating shaft and being adapted to house a light source and said sensors for each of said light spots, and said first housing being adapted to house said pivotable mirrors, said means for oscillating said mirrors, and an inductive energy transmission being arranged between both housings.

12. Apparatus according to claim 11, wherein a first of said pivotable mirrors comprises an optically perfect clear-glass plate which, in its center, carries a round, partially transparent mirror.

13. Apparatus according to claim 12, wherein a second of said pivotable mirrors comprises a surface-type totally reflecting mirror.

14. Apparatus according to claims 13, wherein said mirrors are cardanically suspended, the first axes of the two swivel systems being separated from one another.

15. Apparatus according to claim 14, wherein the axes of the suspension are disposed asymmetrically with respect to the mirror bodies exactly in the reflection plane.

16. Apparatus according to claim 10, wherein said means for oscillating said mirrors about their respective second axes in an opposite phase sinusoidal manner is disposed between said mirrors.

17. Apparatus according to claims 16, wherein said means for oscillating said mirrors about their respective first axes is adapted by way of an articulate but rigid coupling to deflect said mirrors in a synchronous and equiphase manner around said first axes.

18. Apparatus according to claim 10 wherein at least one of cross-spring elements and strap elements are used as the bearing for the mirrors.

19. Apparatus according to claim 11, wherein said means for oscillating comprises at least one of plunger coils and inductive energy transmission devices.

20. Apparatus according to claim 19, wherein parts of said pivotable mirrors, and said means for oscillating, are constructed as integral components by etching.

21. Apparatus for measuring relative angular velocity and position of two members which are rotatable relative to each other comprising:

a light source fixedly arranged on a central axis of rotation of a first of said members;

first and second reflective elements arranged in fixed spacial relationship relative to a second of said members, each of said reflective elements being pivotable about first and second rectilinear axes thereof;

said first reflective element comprising a clear glass plate having a centrally situated partially reflective spot and said second reflective element comprising a fully reflective mirrored surface;

said reflective elements being arranged substantially adjacent to each other and positioned on said central axis of rotation so that a light beam from said light source is directed onto said partially reflective spot, a portion of said light beam being reflected by said partially reflective spot, and a portion being transmitted to and reflected by said second reflective element;

means for causing said first and second reflective elements to oscillate in an equiphase sinusoidal manner about a first of their respective rectilinear axes and in an opposite phase cosinusoidal manner about a second of their respective rectilinear axes, whereby the respective portions of said light beam reflected by said first and second reflective elements are rotated in opposite directions in first and second concentric circular orbits;

two photoelectric taps arranged in fixed spatial relationship to a first of said members and to each other, one such photoelectric tap being positioned to detect the portion of said light beam rotated in said first concentric circular orbit and the other of said photoelectric taps being positioned to detect the portion of said light beam rotated in said second concentric circular orbit;

means for measuring frequency and phase of outputs from said photoelectric taps as a measure of angular velocity and position of said second member.

22. Apparatus according to claim 21, wherein said first and second reflective members are cardanically suspended, and have x-axes which are separated from one another.

23. Apparatus according to claim 21, wherein the respective rectilinear axes are situated asymmetrically with respect to the first and second reflective elements.

24. Apparatus according to claim 21, wherein a drive for the opposite phase oscillation of said first and second reflective elements about the second of their respective rectilinear axes is arranged between said first and second reflective elements.

25. Apparatus according to claim 22, wherein a drive for the equiphase sinusoidal oscillation of said first and second reflective members about the first of their respective rectilinear axes is coupled to first and second supporting members which support said first and second reflective elements.

* * * * *